(12) United States Patent
Shirk

(10) Patent No.: US 9,248,516 B2
(45) Date of Patent: Feb. 2, 2016

(54) PLANING DEVICE AND METHOD

(75) Inventor: Timothy F. Shirk, Shippensburg, PA (US)

(73) Assignee: Newman Machines Company, Inc., Browns Summit, NC (US)

( * ) Notice: Subject to any disclaimer, the term of this patent is extended or adjusted under 35 U.S.C. 154(b) by 912 days.

(21) Appl. No.: 13/303,829

(22) Filed: Nov. 23, 2011

(65) Prior Publication Data

US 2013/0130594 A1 May 23, 2013

(51) Int. Cl.
*B27C 1/02* (2006.01)
*B23C 3/13* (2006.01)
*B27C 1/12* (2006.01)
*B27C 1/08* (2006.01)
*B27C 1/04* (2006.01)

(52) U.S. Cl.
CPC ... *B23C 3/13* (2013.01); *B27C 1/02* (2013.01); *B27C 1/04* (2013.01); *B27C 1/08* (2013.01); *B27C 1/12* (2013.01)

(58) Field of Classification Search
CPC ............ B23D 1/00; B23D 1/003; B23D 1/02; B23D 1/04; B23D 1/20; B27C 1/12; B27C 1/04; B27C 1/08; B27C 1/10; B23Q 3/002
USPC .............. 144/114.1, 116, 120, 129, 130, 373; 451/299–301, 364, 456
See application file for complete search history.

(56) References Cited

U.S. PATENT DOCUMENTS

| 1,277,995 | A | * | 9/1918 | Muskett | 492/4 |
|---|---|---|---|---|---|
| 1,314,342 | A | * | 8/1919 | Lawrence | 492/4 |
| 1,800,175 | A | * | 4/1931 | Blood | 144/128 |
| 1,938,108 | A | * | 12/1933 | Morris | 144/116 |
| 2,312,439 | A | * | 3/1943 | Peterson | 144/116 |
| 2,780,254 | A | | 2/1957 | Carpentiere | |
| 2,859,780 | A | | 11/1958 | Carlson | |
| 2,873,776 | A | * | 2/1959 | Buttke | 144/252.1 |
| 3,299,921 | A | * | 1/1967 | Jones | 144/375 |
| 3,707,749 | A | * | 1/1973 | Henley | 492/5 |
| 3,724,517 | A | * | 4/1973 | Edwards et al. | 144/116 |
| 3,742,992 | A | | 7/1973 | McMillan | |

(Continued)

FOREIGN PATENT DOCUMENTS

| EP | 813940 A2 | 12/1997 |
|---|---|---|
| EP | 865887 A2 | 9/1998 |
| EP | 1574306 A1 | 9/2005 |

OTHER PUBLICATIONS

"Self-Centering Planer (U.S. Pat. No. 6,447,386)" Information Sheet, 4 pages. OSI Machinerie, Quebec City, Canada.

(Continued)

*Primary Examiner* — Lee D Wilson
*Assistant Examiner* — Tyrone V Hall, Jr.
(74) *Attorney, Agent, or Firm* — Coats & Bennett, P.L.L.C.

(57) ABSTRACT

A planing device with a feed path for moving a material piece. The device includes a cutterhead on one side of the feed path, and a hold down unit on an opposing second side. The hold down unit includes a contact member that is held in a downward position towards the feed path. A cut control member is positioned upstream from the cutterhead. In use, the depth of cut and resulting amount of material removed from the one surface of the piece is dependent upon the thickness of the piece. One or more additional cutterheads may be positioned downstream to remove additional material from the piece.

16 Claims, 12 Drawing Sheets

(56) References Cited

U.S. PATENT DOCUMENTS

| | | | | |
|---|---|---|---|---|
| 4,038,784 | A | * | 8/1977 | Grivna ............................ 451/59 |
| 4,438,795 | A | * | 3/1984 | Plough .......................... 144/373 |
| 4,457,350 | A | * | 7/1984 | Finnila ......................... 144/400 |
| 4,476,906 | A | * | 10/1984 | Crawford et al. ............. 144/116 |
| 4,485,859 | A | * | 12/1984 | Krogstad et al. ........... 144/252.1 |
| 4,624,294 | A | | 11/1986 | Robinson et al. |
| 4,724,877 | A | | 2/1988 | Culley, Jr. |
| 4,846,923 | A | | 7/1989 | Lines |
| 5,396,938 | A | | 3/1995 | Cannaday |
| 5,533,557 | A | * | 7/1996 | Jedlicka et al. ............ 144/253.8 |
| 6,247,511 | B1 | * | 6/2001 | Maeda et al. ................ 144/375 |
| 6,296,029 | B1 | | 10/2001 | Grivna |
| 6,447,386 | B1 | | 9/2002 | LaPointe |
| 6,470,932 | B1 | | 10/2002 | Grivna et al. |
| 6,571,839 | B2 | | 6/2003 | Allison et al. |
| 6,666,246 | B2 | | 12/2003 | Gilbert |
| 6,905,119 | B2 | * | 6/2005 | Guddanti et al. ............. 271/109 |

OTHER PUBLICATIONS

Descriptive information on the Whitney Sectional Roll. Excerpt from The Wood-worker, vol. 17, p. 49. S. H. Smith Co., 1898. Google e-books, http://books.google.com.

* cited by examiner

PLANING DEVICE AND METHOD

BACKGROUND

The present application is directed to a device and method of removing a portion from a surface of a material piece and, more particularly, to removing a portion from the surface based on the thickness of the material piece.

Material such as wood, composites including adhesive and wood strands or fibers, plastics, Styrofoam, etc., may be initially processed into a roughly dimensioned piece. Prior to further using the piece, further processing is required to provide an appropriate finish on at least one of the top and bottom surfaces of the piece, and/or an appropriate thickness measured between the surfaces. One example is a piece of lumber that is initially roughly cut into a board having rough dimensions. The rough lumber may include variations in the thickness, and sections or an entirety of one or both of the top and bottom surfaces may be unfinished. The board requires that additional material be removed from one or both surfaces prior to being usable by a woodworker. Further, the board may need to have a more uniform thickness along its length. Another example is a metal sheet that has rough initial dimensions that requires further processing to obtain the desired thickness and surface finish.

Existing devices and methods of planing a material piece generally include a lower cutterhead to remove material from a bottom surface of the piece and an upper cutterhead to remove material from a top surface of the piece. The depth of cut from the lower cutterhead is set at a fixed amount prior to feeding the material piece into the device. The top cutterhead is set to remove the remaining material from the top surface of the piece. These devices and methods are intended to leave the piece at the desired thickness. A problem with these devices and methods is they do not take into account the typical variation found in rough dimensioned pieces. These devices and methods often remove more material from one surface of the piece than the opposing surface. This often leaves large areas of the piece either unfinished or undersized.

SUMMARY

The present application is directed to devices and methods for removing material from a material piece. One embodiment of the device includes a feed path that extends through the device and includes an inlet and a downstream outlet. The feed path further includes a first side and an opposing second side. The device also includes a cutterhead with at least one blade to remove the portion of the material piece. The cutterhead is positioned on the first side of the feed path. A member is positioned upstream from the cutterhead on the first side of the feed path. The member includes an upstream end that faces away from the cutterhead and a downstream end that faces towards the cutterhead. The member assumes a first position with the downstream end positioned farther into the feed path than the cutterhead and is movable towards a second position upon the application of a first force with the downstream end positioned farther from the feed path than the cutterhead. A hold down unit is positioned on the second surface of the feed path opposite from the member. The hold down unit includes a contact member configured to contact against the material piece and a hold down mechanism operatively connected to the contact member to bias the contact member towards the feed path. The hold down mechanism is yieldable upon the application of a second force that is greater than the first force to move the contact member away from the feed path.

The contact member may include an interior chamber to contain a gas with the contact member being deformable to yield away from the feed path. The device may also include a down stop positioned in proximity to the feed path to contact against the hold down unit to define an outer extent of the contact member relative to the feed path. The member may include an elongated shape with an intermediate pivot positioned between the upstream and downstream ends and being pivotable between the first and second positions. The contact member may be positioned along the feed path upstream from the cutterhead. The cutterhead and the member may be positioned on a vertical bottom side of the feed path and the hold down mechanism may be positioned on a vertical top side of the feed path. A second cutterhead may be positioned on the first side of the feed path to contact the material piece at a point downstream from the cutterhead, and a third cutterhead may be positioned on the second side of the feed path and positioned to contact the material piece downstream from the cutterhead with each of the second and third cutterheads configured to remove an additional amount of material from the material piece.

Another embodiment of the device includes a feed path that extends through the device and includes an inlet and a downstream outlet, a first side and an opposing second side. A cutterhead is positioned on the first side of the feed path. A cut control member is positioned on the first side of the feed path and upstream from the cutterhead. The cut control member is movable between upward and downward positions. The upward position includes a downstream end of the member positioned beyond the cutterhead and the downward position includes the downstream end positioned inside the cutterhead. A hold down unit is positioned on the second side of the feed path at the cut control member. The hold down unit is movable between an outward position in closer proximity to the feed path and an inward position. The hold down unit is maintained in the outward position and is yieldable to the inward position during passage of the material piece along the feed path.

The hold down unit may include a roller that contacts against the material piece and a force-applying mechanism to force the roller towards the feed path with the roller positioned upstream from the cutterhead. The hold down unit may include a roller with a roll surface that is yieldable inwards towards a center of the roller and away from the feed path. The roller may include an internal chamber configured to contain a pressurized gas. The cut control member may be pivotally attached to a support table that extends along the feed path. A pressure member may be positioned downstream from and adjacent to the hold down unit on the second surface of the feed path with the pressure member including a contact member that contacts against the material piece and a force-applying mechanism that forces the contact member outward towards the feed path. The cutterhead may be positioned upstream from pressure member and downstream from the hold down unit. The cutterhead and the cut control member may be positioned on a vertical bottom side of the feed path and the hold down unit may be positioned on a vertical upper side of the feed path.

Another embodiment includes a device for removing material from a surface of a material piece. The device includes a feed path that extends through the device and includes an inlet and a downstream outlet, a first side and an opposing second side. A cutterhead includes at least one blade to remove the portion of the material piece. The cutterhead is positioned on the first side of the feed path. A member is positioned upstream from the cutterhead on the first side of the feed path. The member includes an upstream end that faces away from the cutterhead and a downstream end that faces towards the cutterhead. The member assumes a first position with the downstream end positioned farther into the feed path than the cutterhead and is movable towards a second position upon the application of a first force with the downstream end positioned farther from the feed path than the cutterhead. A hold down member is positioned on the second surface of the feed path opposite from the member. The hold down member is positioned to contact against the material piece and is yieldable upon the application of a second force that is greater than the first force to move away from the feed path.

The application also includes methods of removing material from a material piece. One embodiment includes: moving a first material piece along a feed path with the first material piece having a first thickness; contacting a member that is in an upward position and diverting the material piece upward along the feed path, the member positioned on a vertical bottom side of the feed path; maintaining a hold down member in a downward position and moving the first material piece over a cutterhead without removing a portion of the first material piece, the hold down member positioned on a vertical upper side of the feed path and the cutterhead positioned on the vertical bottom side of the feed path; moving a second material piece along the feed path with the second material piece having a greater thickness than the first material piece; contacting a top surface of the second material piece against the hold down member and maintaining the hold down member in the downward position; moving the member downward a first amount and removing a first portion from the bottom surface of the second material piece; moving a third material piece along the feed path with the third material piece having a greater thickness than the second material piece; contacting a top surface of the second material piece against the hold down member and causing the hold down member to yield upward away from the feed path; and moving the member downward a second amount greater than the first amount and removing a second portion from the bottom surface of the third material piece, the second portion being greater than the first portion.

The method may also include simultaneously contacting the second material piece against the cutterhead, the hold down member, and the member. The method may include causing the hold down member to move upward away from the feed path with an arm that is connected to the hold down member pivoting upward and causing a force mechanism connected to the arm to move to a recessed position. The method may include moving the third material piece farther along the feed path and past a second cutterhead and removing a portion from the top surface of the material piece. The method may also include moving the third material piece along the feed path beyond the second cutterhead and removing an additional portion from the bottom surface of the material piece.

The various aspects of the various embodiments may be used alone or in any combination, as is desired.

DETAILED DESCRIPTION

Figure 1:
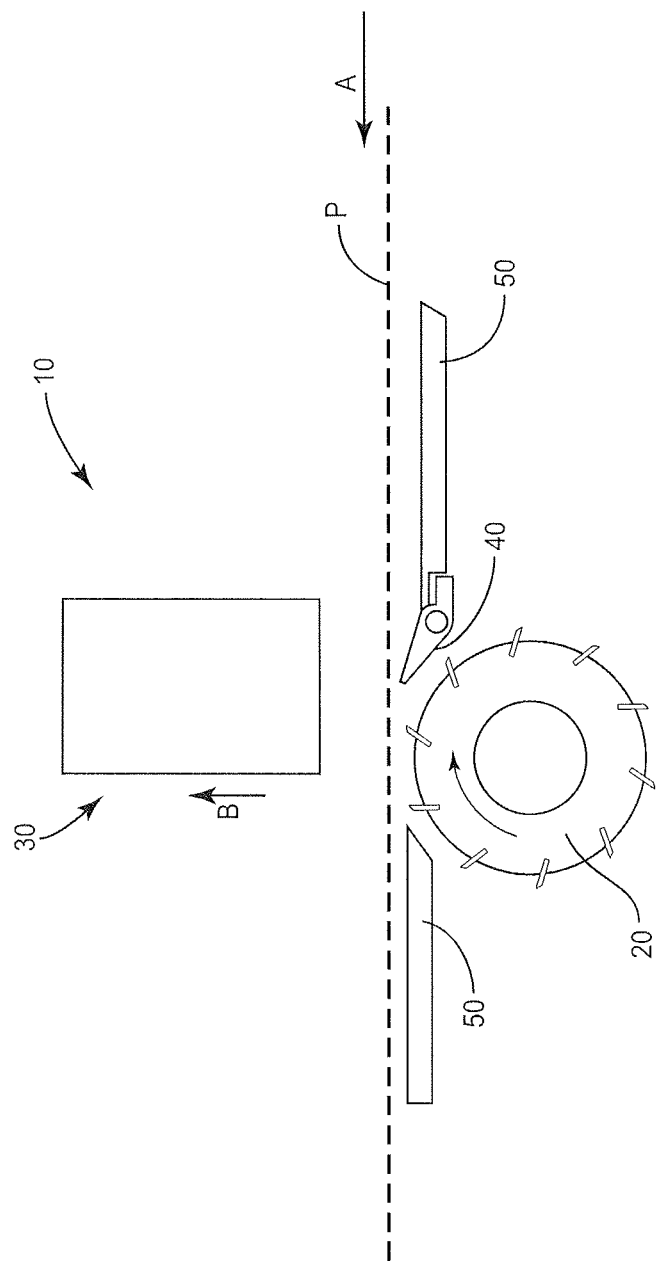
FIG. 1 is a schematic side view of a device for removing material from a material piece.

The present application is directed to a device and method for planing a material piece. FIG. 1 schematically illustrates a device 10 that includes a feed path P along which a material piece is moved in the direction of arrow A. The feed path includes an inlet and an outlet. The device 10 includes a cutterhead 20 on one side of the feed path P, and a hold down unit 30 on an opposing second side. The hold down unit 30 includes a contact member that is held in a downward position towards the feed path P. A cut control member 40 is positioned upstream from the cutterhead 20. Supports 50 are positioned upstream and downstream from the cutterhead 20 and the hold down unit 30.

In use, material pieces are moved along the feed path P in the direction of arrow A. A relatively thin material piece contacts against the control member 40 and is diverted away from the cutterhead 20 and thus material is not removed from the bottom surface. A thicker material piece contacts against the contact member and causes the control member 40 to move downward an amount based on the thickness. This thicker piece is thinner than the existing feed path P and does not cause movement of the hold down unit 30. The amount of material removed by the cutterhead 20 from the bottom surface is dependent upon the thickness of the material piece. An overly thick material piece causes the control member 40 to move fully downward and for the member to be moved away from the cutterhead 20 in the direction of arrow B. A greater amount of material is then removed from the bottom surface by the cutterhead 20.

Figure 2:
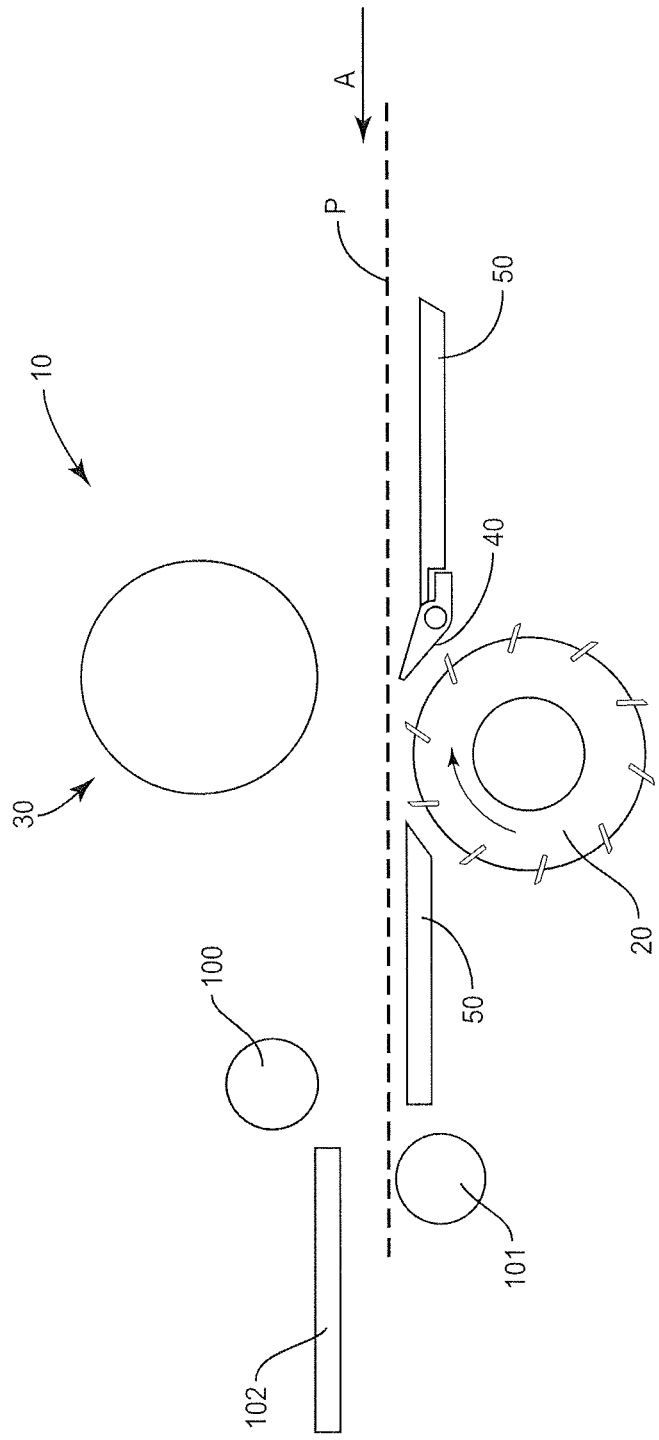
FIG. 2 is a schematic side view of a device for removing material from a material piece.

The device 10 may include a single cutterhead 20 as illustrated in FIG. 1. The device 10 may further include one or more additional cutterheads positioned downstream from the cutterhead 20. FIG. 2 includes an embodiment with additional upper and lower cutterheads 100, 101 that remove additional material from the piece. The additional cutterheads 100, 101 may provide for a more uniform thickness and/or finishes on the surfaces.

Figure 3:
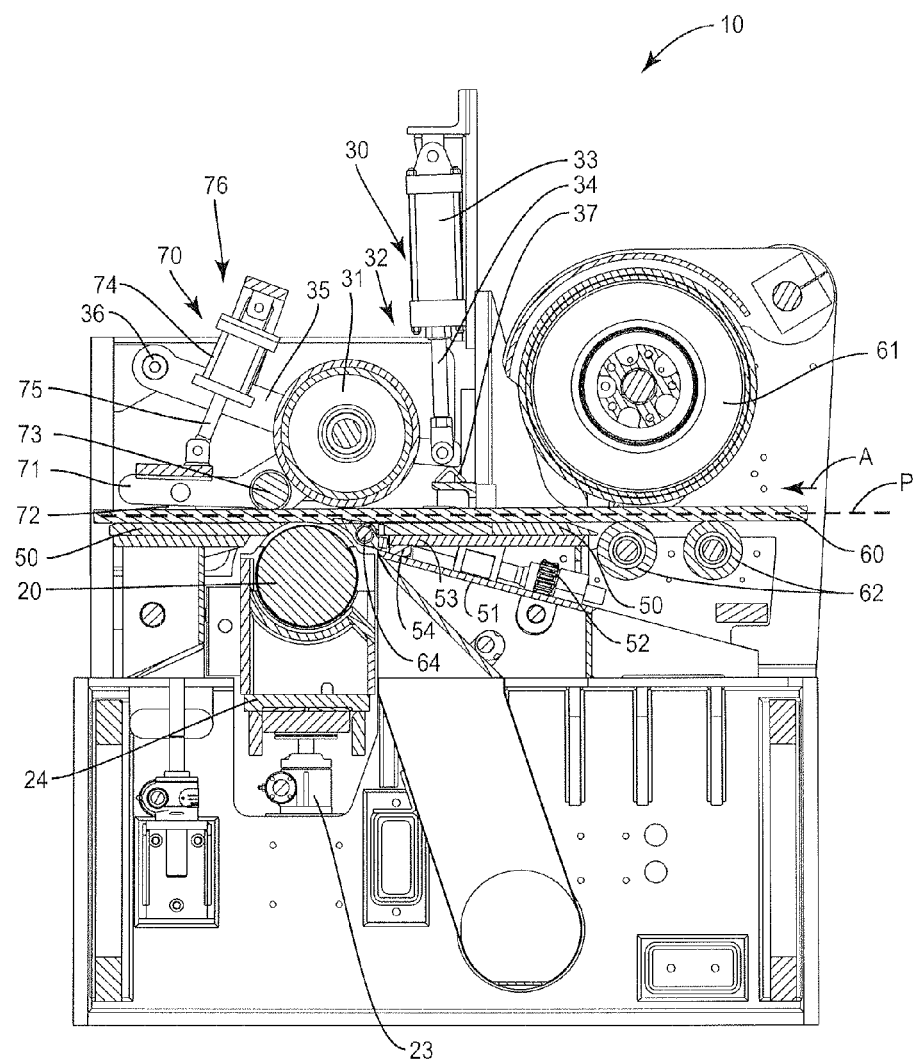
FIG. 3 is a sectional view of a planing device.

FIG. 3 illustrates a material piece 60 moving along the feed path P. The material pieces 60 are generally elongated members with a top surface and a bottom surface. Each of the pieces 60 includes a thickness measured between the top and bottom surfaces. One type of material piece 60 is made of wood (i.e., a piece of lumber). Another piece 60 may include a composite board that includes strands or fibers of wood that are bound together with an adhesive. Various other types of materials may be used with the device 10, including but not limited to plastics, graphite, and Styrofoam. The device 10 may be adjusted to accommodate material pieces 60 of a variety of dimensions.

Figure 4:
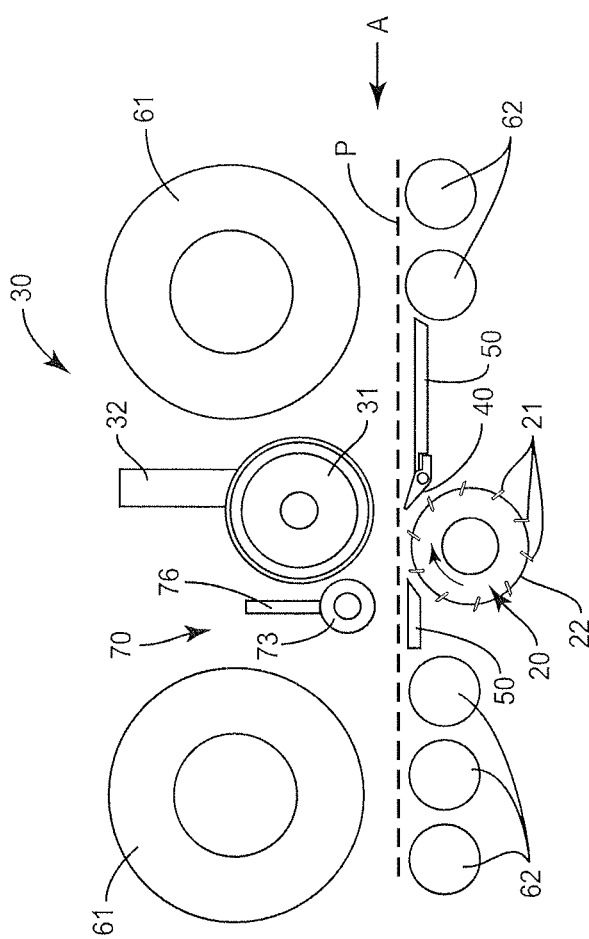
FIG. 4 is a schematic side view of a device.

FIGS. 3 and 4 illustrate devices 10 for removing material from a bottom surface of a material piece 60. A material piece 60 is fed into the devices 10 at an inlet in the direction of arrow A (i.e., from right to left in the Figures). One or more idler and feed rolls 61, 62 are positioned to draw the material piece 60 into the device 10. The idler rolls 62 are positioned on the bottom of the feed path and support the material piece 60. In another embodiment, a table is positioned along the bottom of the feed path P to support the material pieces 60.

One or more feed rolls 61 are positioned on the top side of the feed path P. The feed rolls 61 are positioned to contact against the top surface of the material piece 60. The feed roll 61 is powered to drive the material piece 60 along the feed path P in the direction of arrow A.

A support 50 is positioned downstream from the idler rolls 62 to further support the material piece 60. In one embodiment, the support 50 is a table with an elongated surface that extends along the feed path P. The table 50 is adjustable away from and towards the feed path P. In one embodiment as illustrated in FIG. 3, the support 50 is operatively connected to an incline member 51, which may include a direct attachment to the incline member 51 or which may include one or more intermediate elements that attach the support 50 to the incline member 51. FIG. 3 includes intermediate members that include a second support 53 attached to the underside of the support 50, and a contact member 54 positioned in contact with the incline member 51. An actuator 52, such as a screw jack, is operatively connected to the assembly to move the position of the support 50 upward and downward relative to the feed path P.

The cut control member 40 is positioned at the feed path P. In one embodiment, the cut control member 40 is attached to the downstream end of the support 50. In another embodiment, the cut control member 40 is independent of the support 50.

Figure 5:
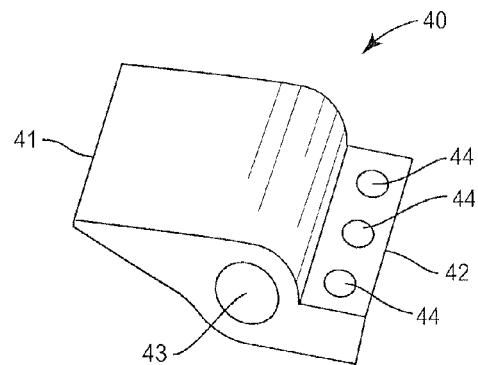
FIG. 5 is a perspective view of a cut control member.
Figure 6:
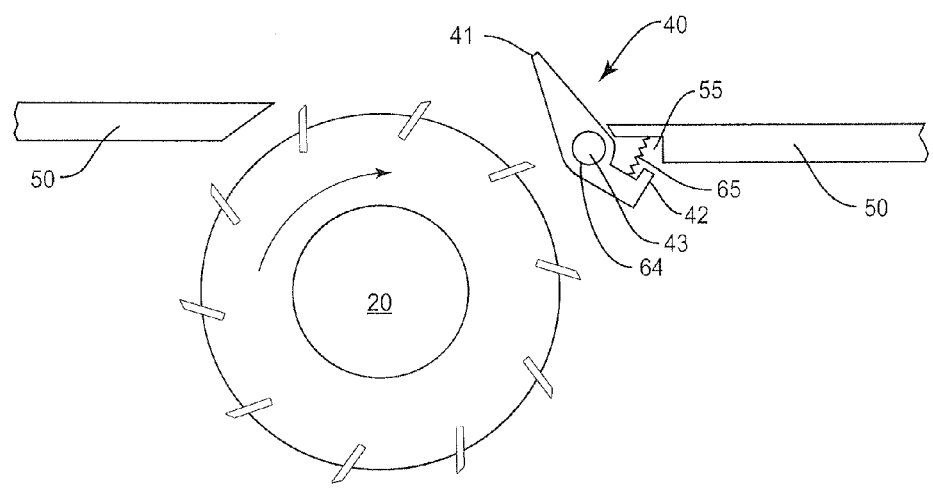
FIG. 6 is a side schematic view of a cut control member and a cutterhead.

FIGS. 5 and 6 illustrate an embodiment of the cut control member 40. The cut control member 40 includes a first end 41 that is positioned towards the cutterhead 20, an opposing second end 42, and a central bore 43. In one embodiment as illustrated in FIG. 6, a shaft 64 extends through the central bore 43 to attach the member 40 to the support 50. A bearing member (not illustrated) may be positioned within the bore 43 and around the shaft 64.

Cavities 44 are positioned towards the second end of the member 40. Biasing members 65, such as springs, are positioned in one or more of the cavities 44. The biasing members 65 engage with the support 50 and bias the member 40 so the first end 41 is positioned upward above the cutterhead 20. The support 50 may also include one or more corresponding cavities 55 to receive an opposing end of the biasing member 65. The force of the one or more biasing members 65 urges the first end 41 of the cut control member 40 upward above the cutterhead 20. This force is overcome by contact with the material pieces 60 that move along the feed path P.

Fasteners (not illustrated) may also be positioned in one or more of the cavities 44 to receive fasteners to attach the cut control member 40 to the support 50.

The hold down unit 30 is positioned above the feed path P and includes a hold down member 31 and a hold down mechanism 32. The hold down member 31 includes a contact surface that contacts against the top surface of the material piece 60 moving along the feed path P. The hold down member 31 may include a roller with a circular cross-sectional shape as illustrated in FIGS. 3 and 4. The roller rotates during the feeding process. The hold down member 31 may also be but is not limited to a plate and a bar. The member 31 may include a compressible surface that deforms when contacted by the material pieces 60.

The hold down mechanism 32 functions to maintain the hold down member 31 in a downward position towards the feed path P. The hold down mechanism 32 is further configured to yield and move the hold down member 31 upward away from the feed path P upon the application of a force above a predetermined amount caused by a relatively thick material piece 60.

One embodiment of a hold down mechanism 32 is illustrated in FIG. 3. The mechanism 32 includes a cylinder 33 with an outwardly-extending rod 34. The cylinder 33 is configured to contain a fluid, such as air or hydraulic fluid. The cylinder 33 maintains the rod 34 in an outward position, and is configured to allow movement of the rod 34 into the cylinder 33 upon the application of the force. Once the force is removed, the rod 34 again extends outward to the extended position.

The mechanism 32 also includes an elongated arm 35 that is operatively attached to the member 31. A first end of the arm 35 is pivotally connected to the framework of the device 10, and a second end is attached to the rod 34. A down stop 37 is positioned between the arm 35 and the feed path P. The down stop 37 is configured to contact the arm 35 to set the position of the member 31 relative to the feed path P. In one embodiment, the down stop 37 is positioned to be contacted by the underside of the elongated arm 35. The position of the down stop 37 relative to the feed path P may be adjusted. In one embodiment, a screw jack (not illustrated) is operatively connected to the down stop 37 to adjust the position.

The cylinder 33 is configured to maintain the rod 34 outward with the arm 35 maintained against the down stop 37. This force is overcome when a material piece 60 above a predetermined thickness moves along the feed path P. The force of the piece 60 moving along the feed path P causes the member 31 and arm 35 to force the rod 34 inward into the cylinder 33. Once the material piece 60 moves along the feed path P beyond the member 31, the cylinder 33 again forces the rod 34 outward with the arm 34 in contact against the down stop 37. In another embodiment, the rod 34 is directly connected to a member 31. In one specific embodiment, the rod 34 is attached to a shaft of the member 31. This embodiment does not include an arm 35.

The hold down mechanism 32 may also include various other configurations that provide for yielding above a predetermined force. One embodiment includes a biasing member, such as a coil spring or a leaf spring, positioned at the end of the arm 35 or otherwise in contact with the member 31 to apply the downward force. Another embodiment includes a dashpot operatively connected to the arm 35 and/or member 31.

As illustrated in FIGS. 3 and 4, the hold down member 31 is positioned along the feed path P to contact the material piece 60 upstream from the cutterhead 20. The hold down member 31 may also extend over the cutterhead 20 and downstream from the cutterhead 20. The hold down member 31 may be centered over the downstream end 41 of the cut control member 40. Other embodiments include the hold down member 31 positioned upstream or downstream from the downstream end 41. As illustrated in FIGS. 3 and 4, the hold down member 31 is positioned to contact the material piece 60 between the cutterhead 20 and the pivot 43 of the cut control member 40.

In one embodiment, a center of the hold down member 31 is aligned with the first end 41 of the cut control member 40. Other embodiments may offset the center upstream or downstream from the first end 41. In specific embodiments, the center may be within a range from about 1/8" upstream of the first end 41 to 1/8" downstream of the first end 41. Other embodiments may include the hold down member 31 having an elongated shape that extends along an elongated section of the feed path P including opposite from the cut control member 40.

In one embodiment, the hold down member 31 is maintained in a position towards the feed path P by gravity. This embodiment may not include a separate hold down mechanism 32. In one specific embodiment, the hold down member 31 is attached to a pivoting arm. Gravity maintains the arm and the hold down member 31 in a downward position towards the feed path P. A material piece 60 moving along the feed path P may contact the hold down member 31 and cause the arm to pivot upward thus moving the member 31 away from the feed path P. The hold down member 31 may also be positioned in various other manners than on an arm that provide for gravity to maintain it in a downward position.

The cutterhead 20 includes a body 22 with one or more blades 21 that extend outward to remove portions of the bottom surface of the material piece 60. In one embodiment, the cutterhead 20 includes a cylindrical body 22 with a plurality of blades 21. The cutterhead 20 is adjustable relative to the feed path P. The adjustment provides for removing different amounts from the bottom surface of the material piece 60. As illustrated in FIG. 3, the cutterhead 20 may be operatively connected to a support 24. An adjustment device 23 is positioned below the support 24 to adjust the position of the cutterhead 20. In one embodiment, the adjustment device 23 is a pneumatic cylinder with a base and outwardly extending arm that engages the support 24. The adjustment device 23 may also include a screw jack.

Figure 7:
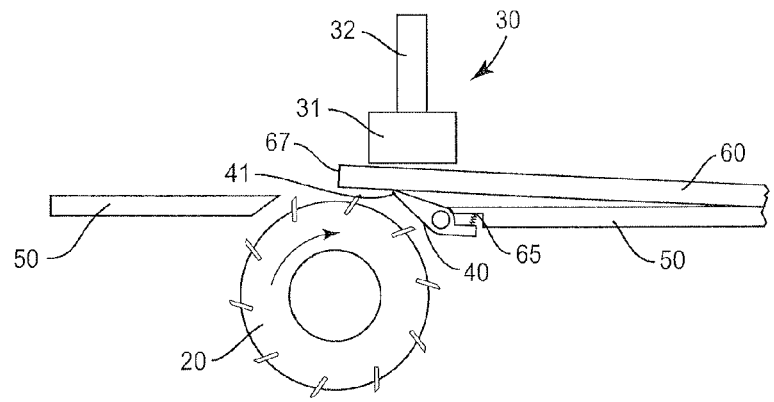
FIG. 7 is a side schematic view of a material piece with a first thickness moving along the feed path.

FIG. 7 illustrates the operation of the device 10 as a thin material piece 60 moves along the feed path P. This material piece 60 has a thickness that is less than the distance between the first end 41 of the cut control member 40 in the upward position and the hold down member 31. The material piece 60 is moved along the feed path P and supported by the support 50. The cut control member 40 is biased in the upward position by the one or more biasing members 65. The first end 41 of the cut control member 40 is positioned above the level of the cutterhead 20. As the material piece 60 moves along the feed path P, the leading end 67 contacts against the cut control member 40. The cut control member 40 diverts the material piece 60 towards the hold down member 31 and away from the cutterhead 20. Therefore, no material is removed from the bottom surface of the material piece 60. Further, the thin piece 60 does not apply a force that causes the hold down member 31 to yield upward away from the feed path P.

Figure 8:
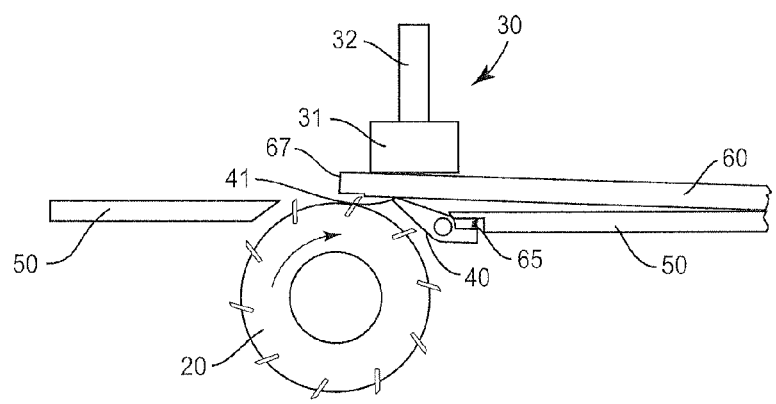
FIG. 8 is a side schematic view of a material piece with a second thickness moving along the feed path.

FIG. 8 illustrates the operation of the device 10 with a thicker material piece 60 moving along the feed path P. The material piece 60 has a thickness that is greater than the distance between the first end 41 of the cut control member 40 in the upward position and the hold down member 31. The piece 60 is also thinner than the distance between the support 50 and the member 31. As the material piece 60 moves along the feed path P, the piece 60 simultaneously contacts against the cut control member 40 and the member 31. The force applied by the hold down mechanism 32 is greater than the force of the biasing member 65 that biases the cut control member 40 towards the upward position. Therefore, the material piece 60 causes the cut control member 40 to pivot downward below the cutterhead 20. The piece 60 maintains contact against the member 31 with the cut control member 40 pivoting an amount dependent upon the thickness of the piece 60. The pivoting movement of the cut control member 40 exposes the cutterhead 20 and results in material being removed from the bottom surface. The amount of material removed depends upon the thickness of the piece 60. In this embodiment, the cut control member 40 pivots downward away from the feed path P, but does not reach the downward position (i.e., it can pivot farther downward away from the feed path P).

In another embodiment with a piece 60 having a thickness equal to the distance between the support 50 and the member 31, the cut control member 40 will completely pivot downward away from the feed path P. In one embodiment, the cut control member 40 aligns with the support 50 when pivoted downward.

Figure 9:
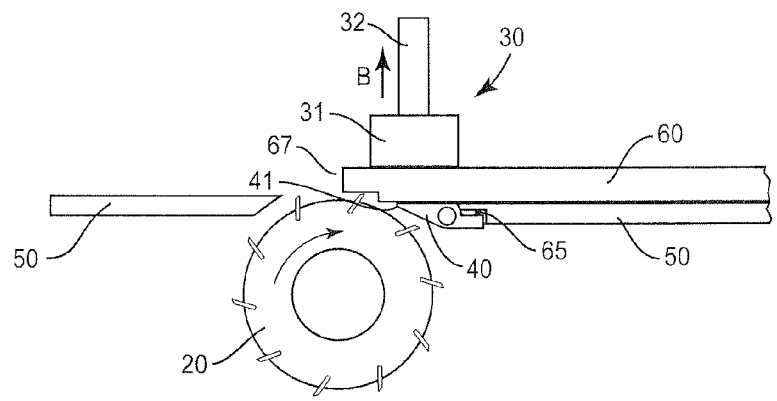
FIG. 9 is a side schematic view of a material piece with a third thickness moving along the feed path.

FIG. 9 illustrates a material piece 60 that is thicker than the distance between the table 50 and the member 31. As the piece 60 moves along the feed path P, the piece 60 moves along the support 50 and contacts against the cut control member 40 and the member 31. The thickness of the piece 60 causes the cut control member 40 to pivot downward a maximum amount. In one embodiment as illustrated in FIG. 9, this positions the cut control member 40 level with the table 50. The piece 60 also applies a force on the hold down member 31 that is greater than the force applied by the hold down mechanism 32. This causes the member 31 to yield upward away from the feed path P. This movement is illustrated by arrow B in FIG. 9. With the cut control member 40 pivoted the full extent downward, a maximum amount of material is removed from the bottom surface of the piece 60. After the piece 60 moves farther along the feed path P and beyond the member 31, the hold down member 31 returns to the down position set by the down stop 37 (See FIG. 3).

Using the device 10 illustrated in FIG. 3, the force causes the member 31 to move upward away from the feed path P. This movement is facilitated by the configuration of the hold down mechanism 32, and specifically includes the arm 35 pivoting about the connector 36 and out of contact with the down stop 37 and rod 34 moving into the cylinder 33. Once the piece 60 moves beyond the member 31, the rod 34 moves outward from the cylinder 33 causing the arm 35 to pivot downward against the down stop 37 and the member 31 to move downward towards the feed path P. Other embodiments of the hold down mechanism 32 function in a manner to also allow the hold down member 31 to move away from the field path P.

Figure 10:
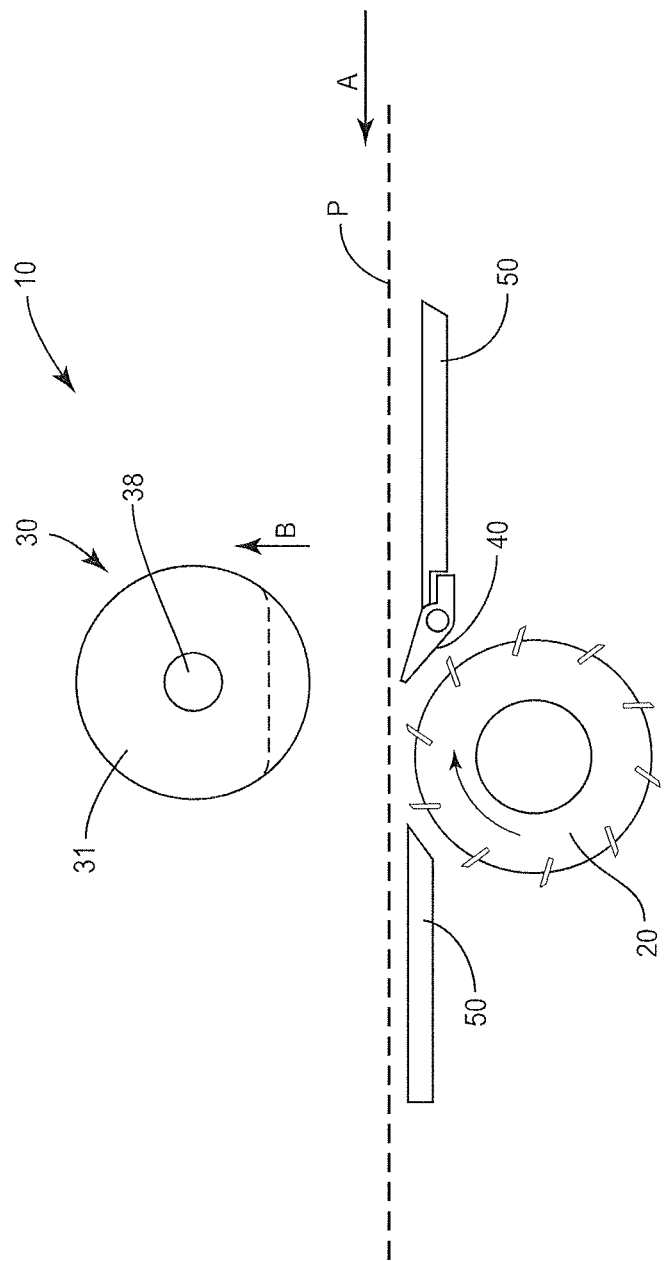
FIG. 10 is a schematic side view of a device for removing material from a material piece.

FIG. 10 illustrates another hold down unit 30 that includes a pneumatic hold down member 31. The member 31 includes an interior chamber that receives gas. In one embodiment, the interior chamber receives air. The amount of gas inserted into the interior chamber controls the hardness of the member 31 and the ability to yield away from the feed path P when contacted by a relatively thick material piece 60. The hold down unit 30 further includes a shaft 38 for mounting the member 31. The shaft 38 may be adjustable relative to the feed path P to position the member 31 at the desired location. In one embodiment, the member 31 includes a single interior chamber to contain the gas. Other embodiments include two or more separate chambers that may or may not be in communication.

In use, the shaft 38 is adjusted to the desired location relative to the feed path P and then secured in place. The member 31 is filled with gas to obtain the desired amount of hardness to control the amount of yielding. During use, the member 31 contacts against material pieces 60 that move along the feed path P. Pieces 60 above a predetermined thickness cause the member 31 to yield and move away from the feed path P as illustrated by the dashed lines in FIG. 10. The amount of yielding will depend upon the thickness of the material piece 60 and the hardness of the member 31. In one embodiment, the shaft 38 is fixed in position and just the member 31 yields. Other embodiments may include the shaft 38 also yielding away from the feed path P.

Figure 11:
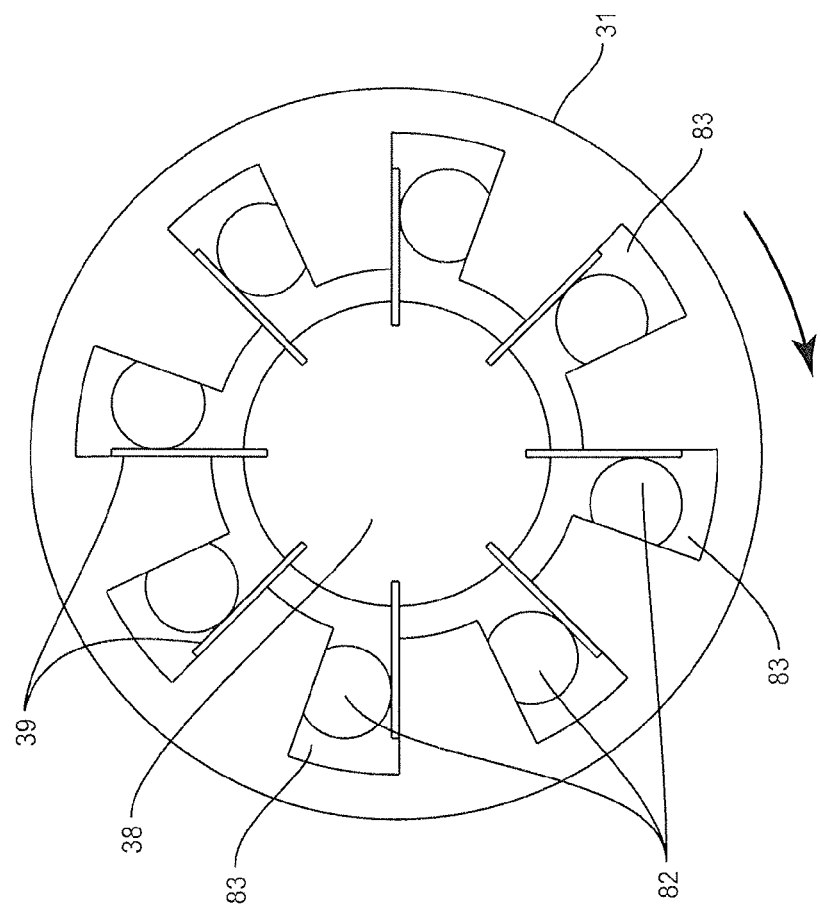
FIG. 11 is a schematic side view of a hold down member.

FIG. 11 illustrates another embodiment of a yielding hold down member 31. This embodiment does not include an interior chamber, but rather a series of pockets 83 that open inwards towards the center. A shaft 38 extends through the center and includes splines 39 that extend radially outward into the pockets 83. Biasing members 82 are positioned in the pockets 83. The member 31 is yieldable to deform inward towards the center and away from the feed path P during passage along the feed path P of a relatively thick material piece 60. In one embodiment, the member is a Whitney Sectional Roll available from Newman Machine Company, Inc. of Greensboro, N.C.

In one embodiment, the hold down member 31 in these embodiments is centered with the downstream end of the member 40. Alternatively, the hold down member 31 may be positioned upstream or downstream from the member 40.

In one embodiment of the hold down members 31 as illustrated in FIGS. 10 and 11, the hold down member 31 is a roller with a circular cross-sectional shape. The member 31 is configured to rotate during the feeding of the material piece 60 along the feed path P. Hold down member 31 may also include other shapes.

The hold down units 30 that include members 31 as illustrated in FIGS. 10 and 11 may also include a hold down mechanism 32 as described above. A first amount of yielding of the unit 30 is accomplished by the deformation of the member 31. Additional yielding may occur by the hold down mechanism 32 moving the member 31 away from the feed path P.

A second hold down unit 70 is located downstream from the first hold down unit 30. The hold down unit 70 includes a member 73 that contacts against the material piece 60, and a hold down mechanism 76 that applies a downward force. The member 73 may include a variety of configurations, including a roller as illustrated in FIGS. 3 and 4. The member 73 may also include a bar or plate.

The hold down mechanism 76 includes an arm 71 that is attached to the member 73. The arm 71 is pivotally attached to the framework of the device 10. The hold down mechanism 76 further includes a cylinder 74 with a rod 75. The cylinder 74 and rod 75 have the same structure as the cylinder 33 and rod 34 described above with the hold down mechanism 32. The rod 75 is attached to the arm 71 to maintain the arm 71 downward towards the feed path P. A down stop 72 is positioned to adjust the location of the member 73 relative to the feed path P. The down stop 72 has the same structure as the down stop 37 described above. The hold down mechanism 76 applies a downward force on the member 73. This maintains the work piece 60 against the cutterhead 20 and support table 50. Further, the hold down mechanism 76 may yield the member 73 to allow passage of thicker pieces 60.

The hold down mechanism 76 may also include various other configurations that provide for yielding above a predetermined force. One embodiment includes a biasing member, such as a coil spring or a leaf spring, to apply the downward force to the member 73. Another embodiment includes a dashpot operatively connected to the member 73.

The second hold down member 70 is positioned downstream from the first hold down unit 30. The second hold down member 73 is further positioned downstream from the cutterhead 20. In one embodiment, the device 10 does not include a second hold down member 73.

As illustrated in FIG. 4, one or more feed rolls 61 and idler rolls 62 may be positioned downstream from the cutterhead 20 to further support and/or move the material piece 60 along the feed path P.

In one embodiment, the members 31, 73 are each rollers. The rollers may be constructed from various materials. In one embodiment, the rollers include a resilient outer surface that resilient deforms upon contact with the pieces 60.

The device 10 may be used for removing material from a single surface of the material piece 60. In one embodiment, the material piece 60 is inserted in a first orientation to remove material from a first surface. Removal of material from a single surface may be adequate for the desired output. In another embodiment, the material piece 60 is inverted and fed again through the device 10 to remove material from an opposing second surface. The positioning of the cutterhead 20 and/or the hold down unit 30 may be re-adjusted prior to introducing the piece 60 through the device 10 the second time. This process may remove material from just one surface or from both surfaces of the piece 60.

Figure 12:
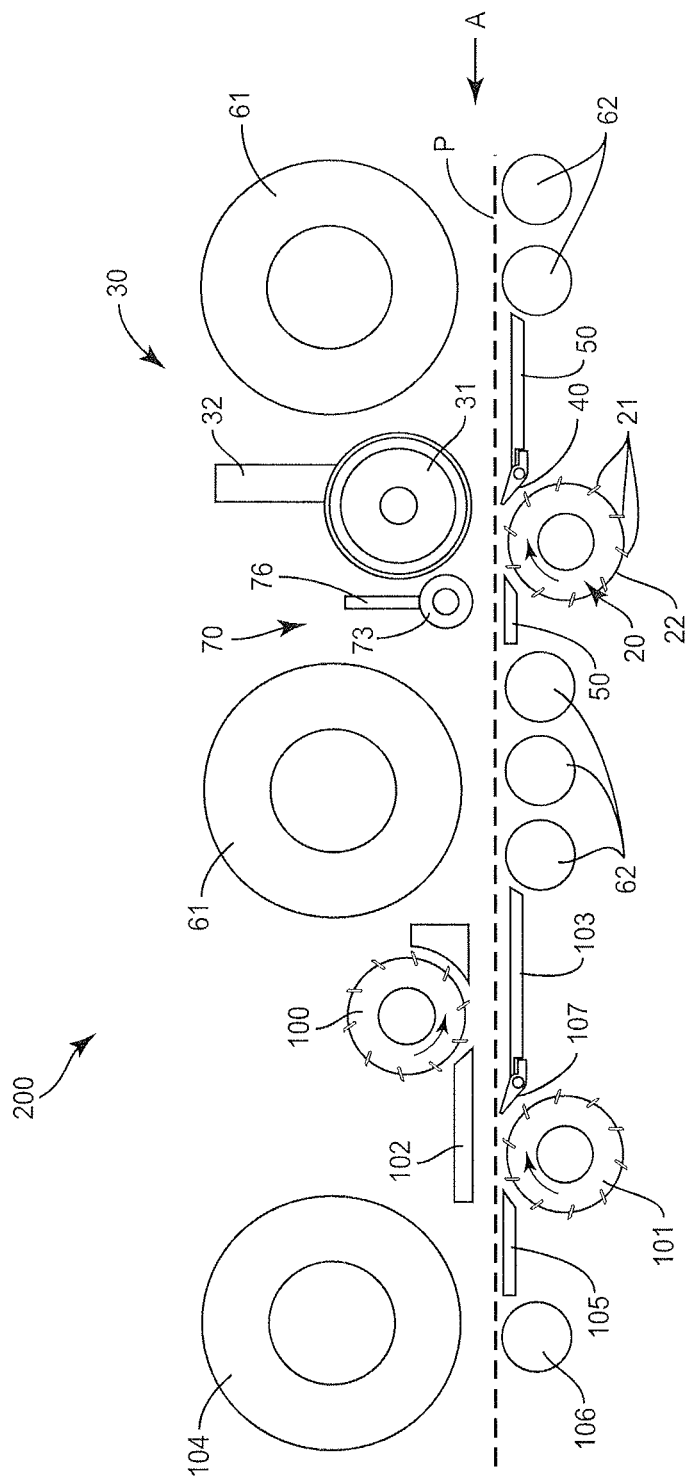
FIG. 12 is a side schematic view of a device.

In another embodiment, one or more additional cutterheads are located downstream from the cutterhead 20 to remove additional material from the piece 60. FIG. 12 illustrates one embodiment with the device 200 including two additional cutterheads 100, 101. Downstream from the first cutterhead 20 and the hold down unit 30 are opposing feed and idler rolls 61, 62. A support 103 is positioned on the bottom of the feed path P to further support the piece 60. Cutterhead 100 is positioned on the upper surface of the feed path P to remove material on the top surface of the piece 60. A cut control member 107 similar to the cut control member 40 previously described, is positioned to feed the piece 60 into a lower cutterhead 101. A support 102 is positioned opposite from the cut control member 107 and cutterhead 101. An additional support 105 is positioned downstream from the cutterhead 101, as well as one or more feed rolls 104 and idler rolls 106.

One example of device for controlling the depth of cut of a cutterhead is disclosed in U.S. Pat. No. 4,476,906, herein incorporated by reference in its entirety.

Figure 13:
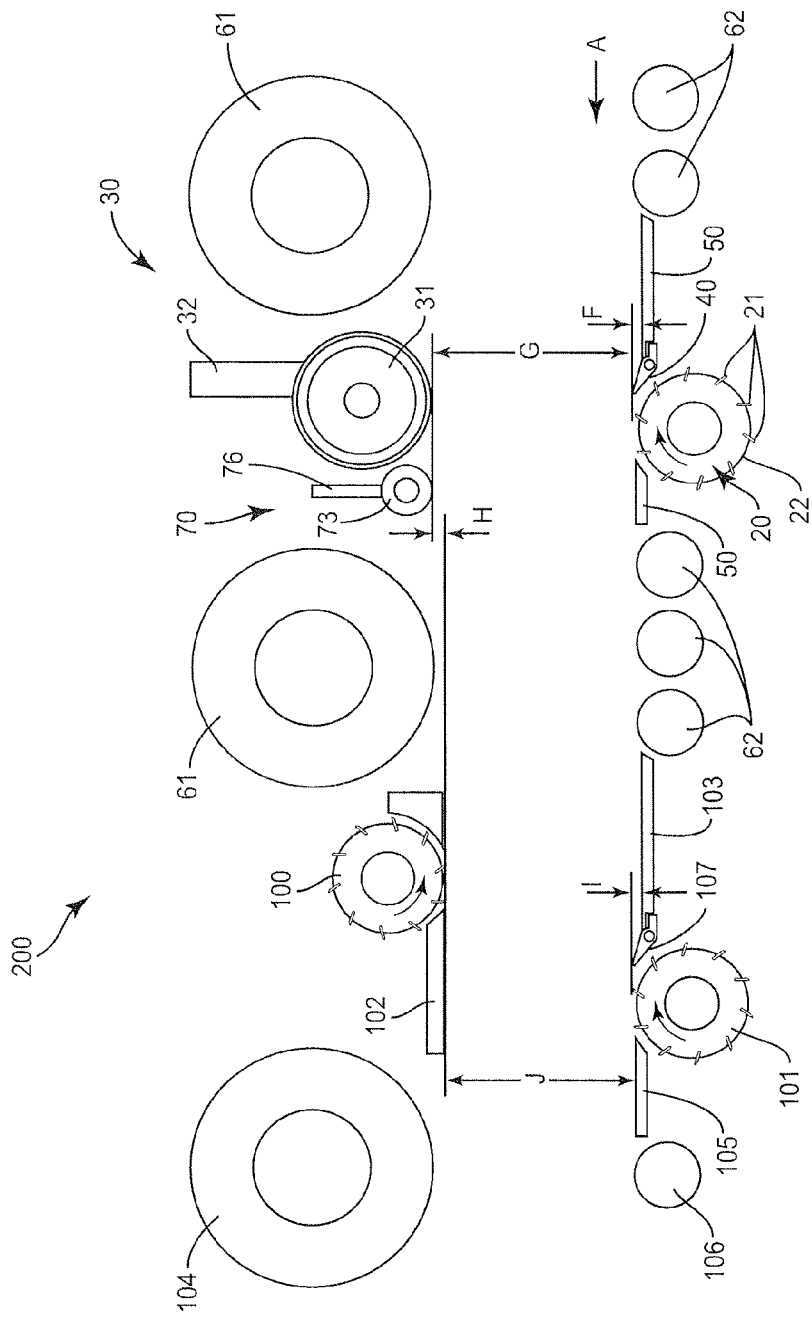
FIG. 13 is a side schematic view of a device.

FIG. 13 illustrates one embodiment of a device 200 with the various elements positioned to finish a material piece 60. FIG. 13 includes the member 31 in the downward position, and the cut control member 40 in the upward position.

The cutterhead 20 is positioned above the level of the support 50. In this embodiment, the cut control member 40 may pivot downward to a level equal to the table 50. In this embodiment, the maximum amount of material that can be removed by the cutterhead 20 is illustrated by dimension F.

In use, the piece 60 is moved in the direction of arrow A along the feed path P. The maximum depth of cut F occurs when the piece 60 has a thickness that is greater than or equal to the distance between the support 50 and the member 31. After moving past the cutterhead 20, the piece 60 includes a thickness indicated by dimension G.

The piece 60 is further moved along the feed path P by the additional feed roll 61 and is supported by the idler rolls 62 and the support 103. The top cutterhead 100 is positioned below the level of the member 31 by a distance H. Therefore, an amount of material equal to the distance H is removed from the top surface of the piece 60 as it moves past the cutterhead 100. The support 103 is positioned opposite from the cutterhead 100 to support the piece 60 and maintain the piece 60 in contact with the cutterhead 100.

The cut control member 107 functions similarly to member 40. In this embodiment, the cut control member 107 may pivot downward to the level of the support 103. Therefore, a maximum amount of material that can be removed from the bottom surface of the piece 60 by the cutterhead 101 is indicated by dimension I. The support 102 is positioned opposite from the cutterhead 102 to support the piece 60 and prevent or reduce bouncing during the cutting process.

After the piece 60 has moved through the device 200, the piece 60 has a thickness indicated by dimension J. The piece 60 further includes finished top and bottom surfaces that have been cut by one or more of the cutterheads 20, 100, 101. This provides for the piece 20 to have a uniform thickness with parallel surfaces and a constant thickness along the length of the board.

Pieces 60 that move through the device 200 with a smaller thickness may not have material removed from one or both surfaces. The amount of material removed from the pieces 60 is dependent upon the initial thickness of the piece 60 and the settings of the cutterheads 20, 100, 101 and the cut control members 40, 107.

The device may be configured for simultaneously feeding multiple pieces 60 in a side-by-side arrangement along the width of the feed path P. The one or more cut control members 40, 107 may includes a series of individual members that are spaced apart along the width of the feed path P. Further, one or both of the first hold down unit 30 and second hold down unit 70 may include multiple independent units that are also spaced apart along the width of the feed path P. One or more the feed rolls 61, 104 may also include multiple different units. This configuration provides for each of the pieces 60 that move simultaneously along the feed path P to be independently planed on one or both surfaces.

In some embodiments, the cutterhead 20 and the cut control member 40 are on a vertical lower side of the feed path P and the hold down unit 30 is on a vertical upper side of the feed path P. Other embodiments may include an opposite positioning of these elements. One embodiment is illustrated in FIG. 14 with the hold down unit 30 on the vertical lower side of the feed path P and the cut control member 40 and cutterhead 20 on the vertical upper side of the feed path P.

Figure 14:
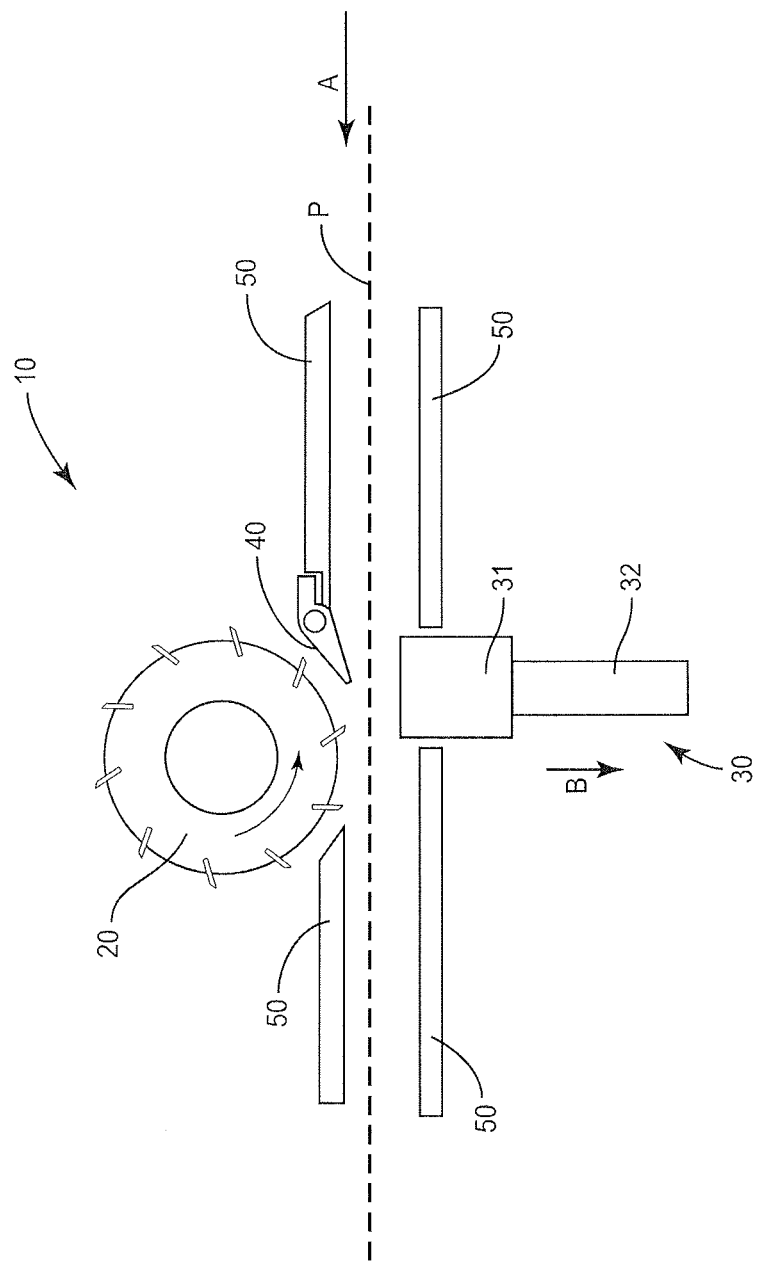
FIG. 14 is a side schematic view of a device.

In the embodiment of FIG. 14, additional supports 50 are positioned on the upstream and downstream side of the hold down unit 30. Pieces 60 moving along the feed path P contact against the support 50 upstream from the hold down unit 30. In one embodiment, the edge of the hold down member 31 extends into the feed path P a greater amount than the upstream support 50. The relative positioning of the various elements along the feed path P may be the same as the embodiments described above.

A thin material piece 60 has a thickness that is less than the distance between the first end 41 of the cut control member 40 in the upward position and the hold down member 31. The material piece 60 is moved along the feed path P and supported by the support 50. The cut control member 40 is biased in the upward position by the one or more biasing members. The first end 41 of the cut control member 40 is positioned above the level of the cutterhead 20. The material piece 60 remains away from the cut control member 40 and therefore no material is removed from the top surface. Further, the thin piece 60 does not apply a force that causes the hold down member 31 to yield upward away from the feed path P.

A thicker material piece 60 has a thickness that is greater than the distance between the first end 41 of the cut control member 40 in the upward position and the hold down member 31. The piece 60 is also thinner than the distance between the upper support 50 and the member 31. As the material piece 60 moves along the feed path P, the piece 60 simultaneously contacts against the cut control member 40 and the member 31. The force applied by the hold down mechanism 32 is greater than the force of the biasing member 65 that biases the cut control member 40 towards the upward position. Therefore, the material piece 60 causes the cut control member 40 to pivot below the cutterhead 20. The piece 60 maintains contact against the member 31 with the cut control member 40 pivoting an amount dependent upon the thickness of the piece 60. The pivoting movement of the cut control member 40 exposes the cutterhead 20 and results in material being removed from the top surface. The amount of material removed depends upon the thickness of the piece 60. For a material piece 60 with this intermediate thickness, the cut control member 40 pivots away from the feed path P, but does not reach the downward position (i.e., it can pivot farther away from the feed path P).

For a piece 60 that is thicker than the distance between the upper support 50 and the member 31 in the outward position, the piece 60 causes the cut control member 40 to pivot a maximum amount. The piece 60 also applies a force on the hold down member 31 that is greater than the force applied by the hold down mechanism 32. This causes the member 31 to yield away from the feed path P. This movement is illustrated by arrow B in FIG. 14. With the cut control member 40 pivoted the full extent, a maximum amount of material is removed from the top surface of the piece 60. After the piece 60 moves farther along the feed path P and beyond the member 31, the hold down member 31 returns to the down position set by the down stop 37.

The embodiment of FIG. 14 may further include one or more additional hold down units 70 on an opposite side of the feed path P from the cutterhead 20. This embodiment may also be used with one or more additional downstream cutterheads in a similar manner as described above in FIG. 12.

Another embodiment with the orientation of the cutterhead 20 vertically above the feed path P includes yieldable hold down members 32 as illustrated in FIGS. 10, 11.

Figure 15:
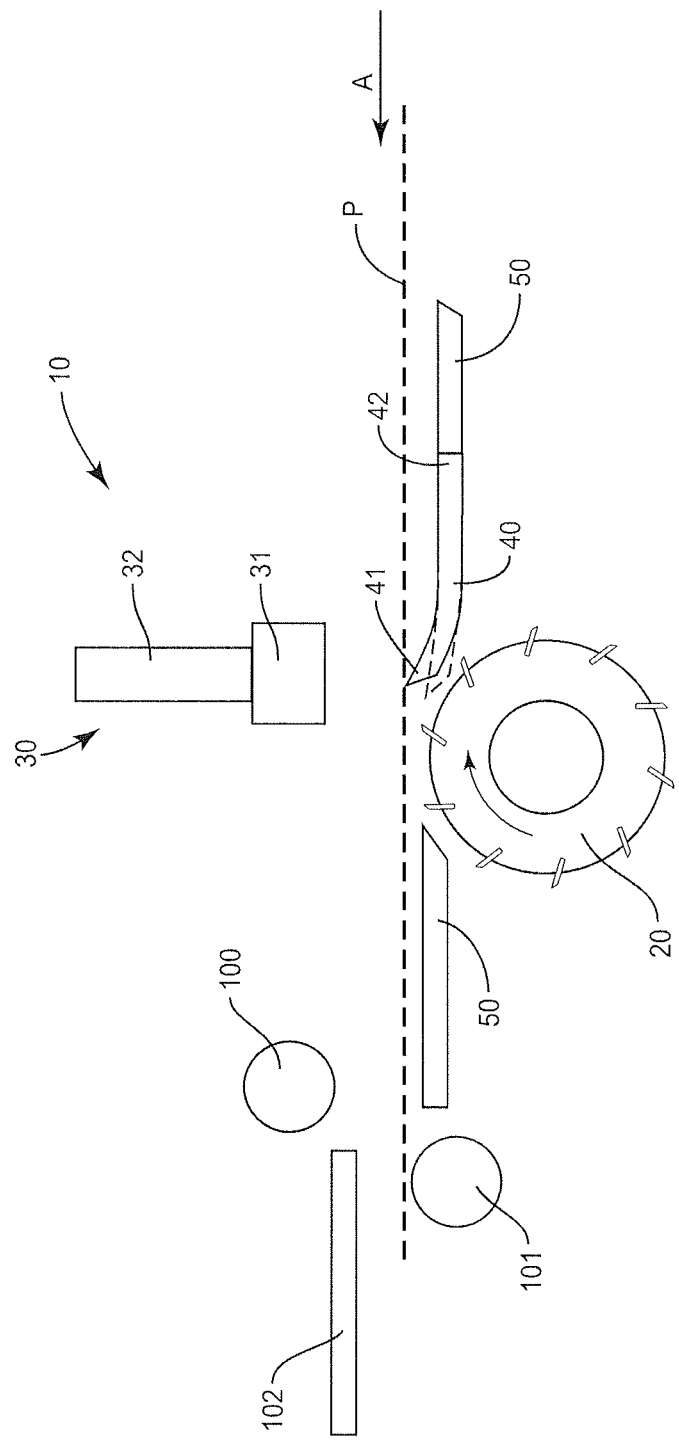
FIG. 15 is a schematic side view of a device for removing material from a material piece.

The cut control member 40 may be pivotally attached at the feed path P as described above. Another embodiment of the cut control member 40 includes an elongated flexible member as illustrated in FIG. 15. The member 40 includes a downstream end 41 that is positioned towards the cutterhead 20 and an opposing upstream end 42. The member 40 is mounted at the feed path P to allow for movement of the downstream end 41.

In a first assumed position as illustrated in FIG. 15, the downstream end 41 is positioned above the level of the cutterhead 20 to divert relatively thin material pieces 60. The member 40 is flexible such that relatively thicker boards deflect the downstream end 41 away from the feed path P to a second position illustrated in dashed lines. This second position includes the end 41 being below the cutterhead 20 such that a portion of the bottom surface of the material piece 60 is removed by the cutterhead 20. In one embodiment, thicker material pieces 60 contact against the member 31 and cause the downstream end 41 to move away from the feed path P and downward below the level of the cutterhead 20.

In one embodiment such as illustrated in FIGS. 4 and 10, the support 50 positioned downstream from the cutterhead 20 may include a floating device to support material pieces 60 that move along the feed path P. In one embodiment, the floating device is roller that is biased outward above the support 50. The floating device would prevent relatively thin material pieces 60 that are diverted away from the cutterhead 20 from moving back into the cutterhead 20. For relatively thicker pieces that contact against the hold down member 73, the hold down unit 70 would bias the material piece 60 towards the support 50. The force would overcome the biasing force on the floating device and the floating device would move away from the feed path P and be flush with or recessed below the level of the support 50.

In one specific embodiment, the cutterhead 20 is outward into the feed path P approximately 0.031 inches more than the support table 50.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A device for removing material from a surface of a material piece comprising:
    a feed path that extends through the device and includes an inlet and a downstream outlet, the feed path further including a first side and an opposing second side;
    a cutterhead including at least one blade to remove the portion of the material piece, the cutterhead positioned on the first side of the feed path;
    a member positioned upstream from the cutterhead on the first side of the feed path, the member including an upstream end that faces away from the cutterhead and a downstream end that faces towards the cutterhead, the member assuming a first position with the downstream end positioned farther into the feed path than the cutterhead and being movable towards a second position upon the application of a first force with the downstream end positioned farther from the feed path than the cutterhead;
    a hold down unit positioned on the second side of the feed path opposite from the member, the hold down unit including a contact member configured to contact against the material piece and a hold down mechanism operatively connected to the contact member to bias the contact member towards the feed path, the contact member positioned directly across the feed path from the member;
    the hold down mechanism being yieldable upon the application of a second force that is greater than the first force to move the contact member away from the feed path.

2. The device of claim 1, wherein the contact member includes an interior chamber to contain a gas, the contact member being deformable to yield away from the feed path.

3. The device of claim 1, further comprising a down stop positioned in proximity to the feed path to contact against the hold down unit to define an outer extent of the contact member relative to the feed path.

4. The device of claim 1, wherein the member includes an elongated shape with an intermediate pivot positioned between the upstream and downstream ends, the member being pivotable between the first and second positions.

5. The device of claim 1, wherein the contact member is positioned along the feed path upstream from the cutterhead.

6. The device of claim 1, wherein the cutterhead and the member are positioned on a vertical bottom side of the feed path and the hold down mechanism is positioned on a vertical top side of the feed path.

7. The device of claim 1, further comprising a second cutterhead positioned on the first side of the feed path and positioned to contact the material piece at a point downstream from the cutterhead, and a third cutterhead positioned on the second side of the feed path and positioned to contact the material piece downstream from the cutterhead, each of the second and third cutterheads configured to remove an additional amount of material from the material piece.

8. A device for removing material from a surface of a material piece comprising:
    a feed path that extends through the device and includes an inlet and a downstream outlet, the feed path further including a first side and an opposing second side;
    a cutterhead positioned on the first side of the feed path;
    a cut control member positioned on the first side of the feed path and upstream from the cutterhead, the cut control member being movable between upward and downward positions, the upward position including a downstream end of the member positioned beyond the cutterhead and the downward position including the downstream end positioned inside the cutterhead;
    a hold down unit positioned on the second side of the feed path at the cut control member, the hold down unit movable between an outward position in closer proximity to the feed path and an inward position, the hold down unit being maintained in the outward position and being yieldable towards the inward position during passage of the material piece along the feed path.

9. The device of claim 8, wherein the hold down unit includes a roller that contacts against the material piece and a force-applying mechanism to force the roller towards the feed path, the roller positioned upstream from the cutterhead.

10. The device of claim 8, wherein the hold down unit includes a roller with a roll surface that is yieldable inward towards a center of the roller and away from the feed path.

11. The device of claim 10, wherein the roller includes an internal chamber configured to contain a pressurized gas.

12. The device of claim 8, wherein the cut control member is pivotally attached to a support table that extends along the feed path.

13. The device of claim 8, further comprising a pressure member positioned downstream from and adjacent to the hold down unit on the second side of the feed path, the pressure member including a contact member that contacts against the material piece and a force-applying mechanism that forces the contact member outward towards the feed path.

14. The device of claim 13, wherein the cutterhead is positioned upstream from the pressure member.

15. The device of claim 8, wherein the cutterhead and the cut control member are positioned on a vertical bottom side of the feed path and the hold down unit is positioned on a vertical upper side of the feed path.

16. A device for removing material from a surface of a material piece comprising:
    a feed path that extends through the device and includes an inlet and a downstream outlet, the feed path further including a first side and an opposing second side;
    a cutterhead including at least one blade to remove the portion of the material piece, the cutterhead positioned on the first side of the feed path;

a member positioned upstream from the cutterhead on the first side of the feed path, the member including an upstream end that faces away from the cutterhead and a downstream end that faces towards the cutterhead, the member assuming a first position with the downstream end positioned farther into the feed path than the cutterhead and being movable towards a second position upon the application of a first force with the downstream end positioned farther from the feed path than the cutterhead;

a hold down member positioned on the second side of the feed path directly opposite from the member such that the hold down member and the member overlap along the feed path on the opposing first and second sides, the hold down member positioned to contact against the material piece and being yieldable upon the application of a second force that is greater than the first force to move away from the feed path.

\* \* \* \* \*